Jan. 9, 1962 H. G. LINDNER 3,016,519

SYNCHRONIZATION FOR MAXIMUM CORRELATION

Filed June 12, 1956 2 Sheets-Sheet 1

INVENTOR,
HERBERT G. LINDNER.

BY Harry M. Saragovitz

ATTORNEY

Jan. 9, 1962 H. G. LINDNER 3,016,519

SYNCHRONIZATION FOR MAXIMUM CORRELATION

Filed June 12, 1956 2 Sheets-Sheet 2

INVENTOR.
HERBERT G. LINDNER
BY
Harry M. Saragovitz
ATTORNEY 3,016,519

SYNCHRONIZATION FOR MAXIMUM CORRELATION

Herbert G. Lindner, Red Bank, N.J., assignor to the United States of America as represented by the Secretary of the Army Filed June 12, 1956, Ser. No. 590,999
2 Claims. (Cl. 340—171)
(Granted under Title 35, U.S. Code (1952), sec. 266)

The invention described herein may be manufactured and used by or for the Government for governmental purposes, without the payment of any royalty thereon.

This invention relates to synchronization of correlation systems. In the remote control of detonators it is necessary to assure operation at a desired time and yet avoid accidental operation. The use of correlation of apparently random prescheduled noise is admirably suited to such a requirement since the signal can be so complex that there is little chance that it will exist accidentally, and yet a very simple system can be used.

In the present invention the noise is used once to modulate a suppressed carrier transmitter and used over again at the receiver to re-modulate the sidebands thereby restoring the carrier. The receiver must be designed to balance out any carrier directly received from the transmitter or other sources or must include a carrier rejection filter so that only the sidebands from the transmitter can enter the receiver and after conversion continue into a very narrow filter accurately tuned to the restored carrier. Accurate synchronization of the noise at transmitter and receiver would normally require extensive equipment at each receiver, too involved and expensive for quantity production considering the expendable use intended. Therefore the present invention contemplates the use of noise sources intentionally unsynchronized so that during successive transmissions they will often pass through synchronisms. At synchronization the detonation may be accomplished directly, or some preliminary function may be accomplished.

The object of this invention is to simplify expendable remote control devices without losing the desired control of the operation either in failing to operate when desired or operating when not desired.

Further objects of the invention will become apparent in the following description of the invention in connection with the accompanying drawings in which.

Figure 1:
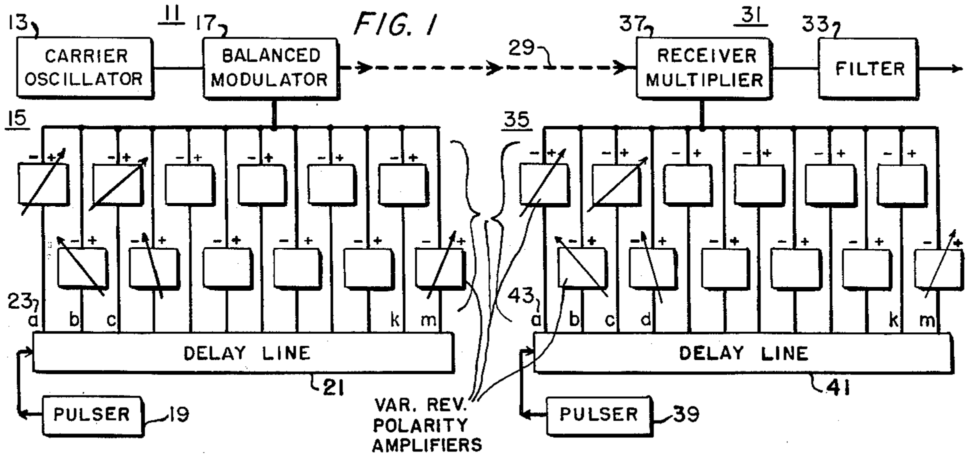
FIG. 1 shows a block diagram of a very simple form of the invention.
Figure 3:
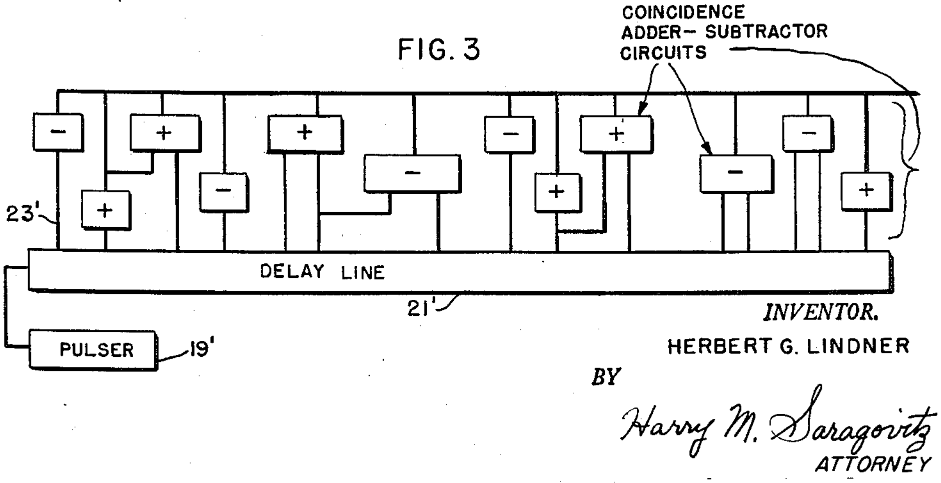
FIG. 3 shows a block diagram of an alternative form of one of the subcombinations of FIG. 1.

In FIG. 1 the transmission system 11 includes a carrier oscillator 13 and a prescheduled noise source 15 providing the inputs to a balanced modulator 17 used as a suppressed carrier modulator and transmitter. The source 15 provides a prescheduled noise output train as a result of each pulse from the pulser 19. One suitable form of prescheduled noise source is illustrated as a delay line 21 with many output taps and having the output from each tap adjustable in an amplifier 23$a$–$m$. A random adjustment of the various amplifiers would result in a random noise train. Normally the taps would be equally spaced and the amplifiers would be adjustable over a wide range with reversible polarity; a zero setting would be equivalent to omitting the tap and amplifier, or a random spacing of the taps. As illustrated in FIG. 3 a result similar to that obtained by the randomly adjusted amplifiers can be accomplished with coincidence circuits 23'$a$–$m$ having random connections to the delay line 21'. In this case the pulse should be of sufficient width to provide overlap in the coincidence circuits corresponding to the duration of the output pulse. Analysis of the delay line system will reveal that it is a specialized type of filter, and could be replaced by any conventional filter having the same characteristics. The delay line system is not directly involved in this invention, but is well suited for actual use and also for purpose of explanation since it is simple both in design and in description. One common method of defining the operation of such circuits is the "unit impulse response" characteristic, or the formula for the output of a filter when a certain unit impulse is applied to the input. In applying the present invention one of the simplest systems for obtaining identical noise functions is to apply identical pulses to filters having identical unit impulse response.

Figure 4:
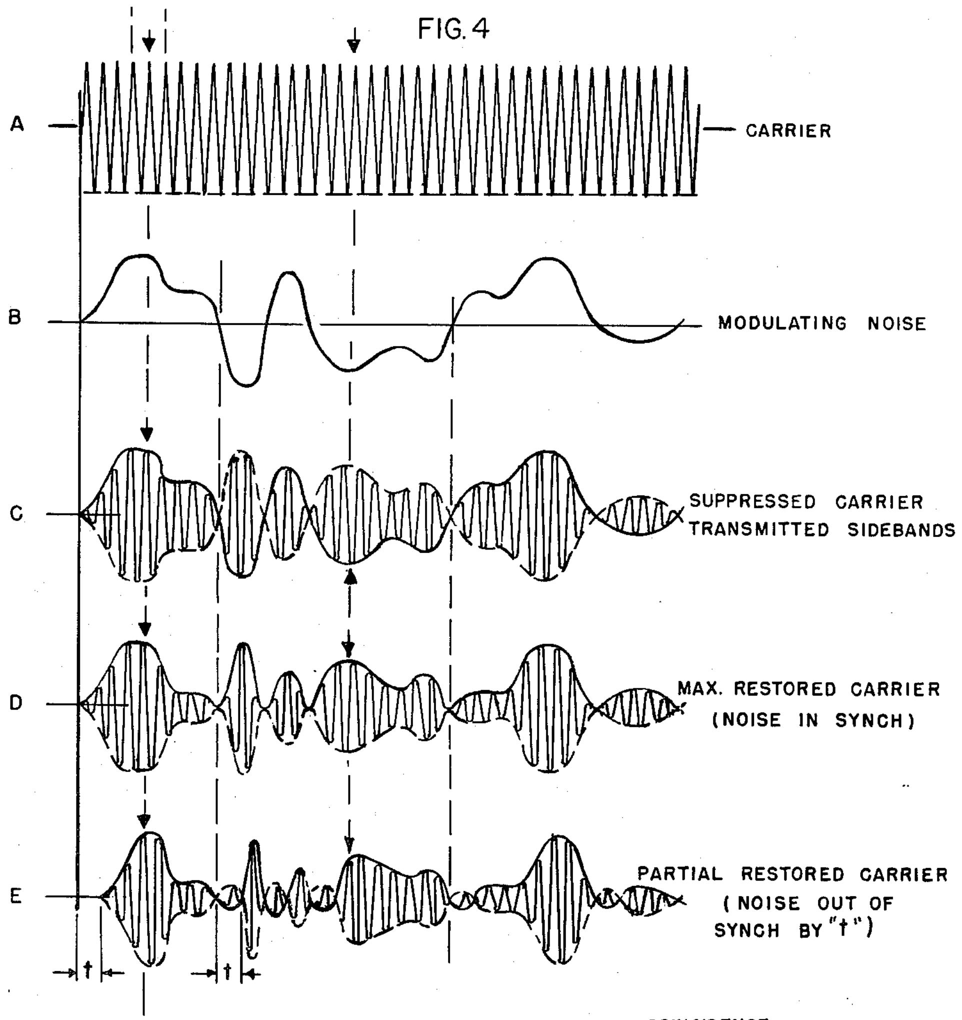
FIG. 4 shows a waveform diagram to explain the operation of the invention.

As more fully analyzed in applicant's copending application for Communication Security Method and System, filed April 16, 1956, Serial No. 580,158, the transmitter in effect multiplies the two inputs together and transmits the product over transmitting medium 29. FIG. 5 of such application is reproduced herein as FIG. 4 to assist in understanding the operation of this invention. With a random noise applied the carrier would be reversed in phase one half of the time and therefore only the sidebands would be actually transmitted.

In the receiving system 31 the transmitted signal and a prescheduled noise from source 35 are supplied to a receiver multiplier 37, whose output is supplied to a filter 33 sharply tuned to the carrier frequency. This noise source is also shown as a delay line 41 with many taps, the amplifiers 43$a$–$m$ on the respective taps having exactly the same adjustment as those of transmitter noise source 15. The pulser 39 of the receiver is set for a slightly different pulse repetition frequency; therefore the two pulsers 19 and 39 will occasionally come into substantial synchronism. As more fully explained in connection with FIGS. 5 and 6 of the above identified application, and FIG. 4 of this application when the noise signals are synchronized the output of the receiver supplies a very strong carrier frequency signal to the sharply tuned filter 33 and the detonator connected to its output is actuated.

Ordinarily the delay line period should be somewhat less than the period between outputs of the pulsers. If the period of the pulsers were expressed as $P_t$ and $P_r$ and the number of pulses, counted from a time at which they were synchronized, as integers $N_t$ and $N_r$, the pulses would again be synchronized each time:

$$N_tP_t=N_rP_r, \text{ and } N_t=N_r-i \text{ (an integer)}$$
$$N_rP_t-iP_t=N_rP_r,\ N_rP_t-N_rP_r=iP_t$$

$$N_r\frac{P_t-P_r}{P_t}=i \text{ (an integer)}$$

If $P_t-P_r$ is large, synchronism is reached more quickly, but perhaps less accurately. If $P_t$ is small, synchronism is reached more quickly but also lasts a shorter time. To avoid accidental detonation by noise signals a reasonably long period of correlation is needed and such correlation must be set for rather accurate synchronism. Therefore, the time $P_t$ which limits the maximum delay line period for correlation must be reasonably long, but the time $P_t-P_r$ must be quite short to avoid passing near synchronism but not close enough for full correlation. It should be understood that the bandwidth available for short range use, as would be suitable for detonator operation, makes the actual time requirement for synchronization and correlation to accomplish detonation rather short, easily less than one second.

Figure 2:
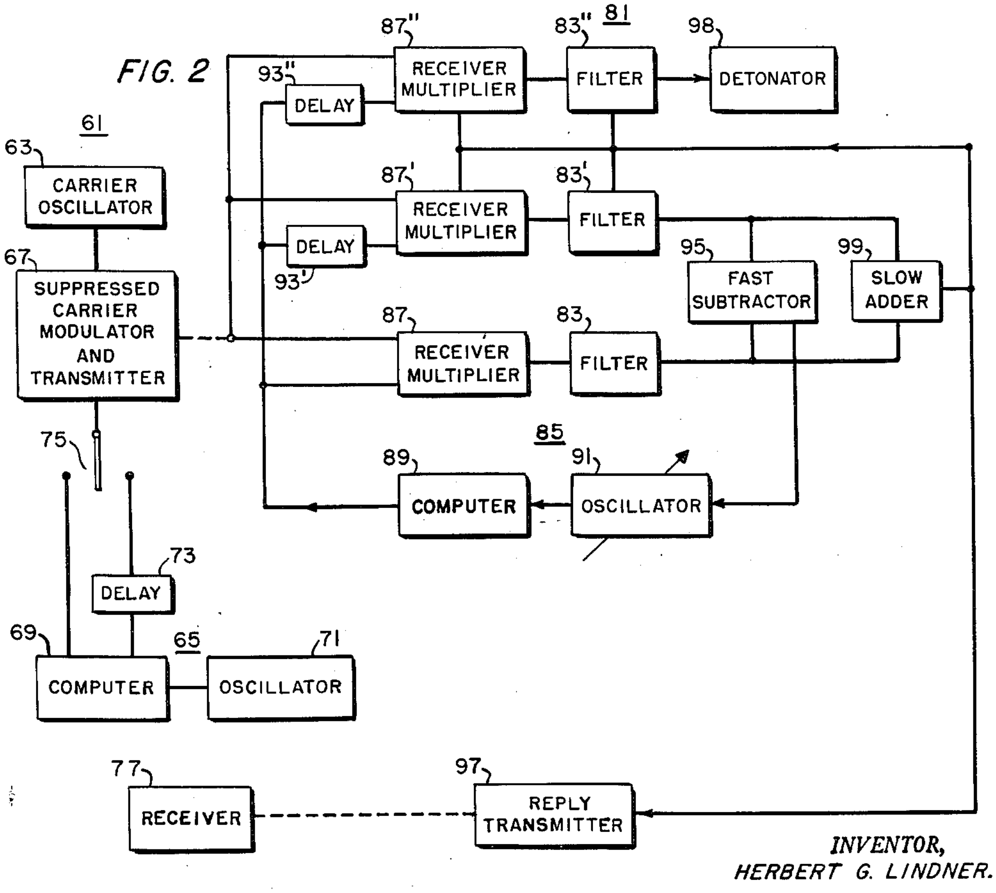
FIG. 2 shows a block diagram of the invention applied to a system giving an answer back that the detonator is ready for operation and also giving a more exacting yet faster control.

In FIG. 2 somewhat different components are shown to illustrate the invention, and additional elements are included. Instead of the noise functions being of the same duration but having different periods, in this case a similar effect is accomplished by generating the two functions at slightly different rates. As a result the systems are certain to attain accurate synchronization gradually during a cycle although they would gradually lose synchronism again.

The transmitting system 61 of FIG. 2 includes carrier oscillator 63 and suppressed carrier modulator and transmitter 67 substantially as in FIG. 1, but the noise generator 65 in this case is shown as a computer 69, further discussed below, controlled by a moderate frequency oscillator 71. The output of the noise generator is provided with an optional selected delay 73 controlled by switch 75 for reasons to appear later. An answer-back receiver 77 may be provided at the control station to show that the detonator is ready.

In the receiving system 81 the receiver multiplier 87 and filter 83 are substantially as in FIG. 1, but again the noise generator 85 is shown as a computer 89 controlled by an oscillator 91 normally operated at slightly higher frequency than that of oscillator 71.

A simple form of computer for generating apparently random, but actually prescheduled, numbers is based on squaring a first number of $n$ digits, discarding about $$\frac{n}{2}$$

of lowest order digits, keeping next $n$ digits for the new number, discarding remaining highest order digits, and repeating the process. For example, if the first number were 81 (two decimal digits) discarding the units and any thousands digits would give only a moderately short series of numbers 81, 6561, 3136, 0169, 0256, 0625, 3844, 7056, 6025, 0004, but if the first number were longer (three decimal digits) discarding the units and ten-thousands and any hundred-thousands digits would give a rather long series of numbers. To reduce the tendency to degenerate to zero some fixed number may be added each time to the first and last digits. If the series is not repetitive it can be made repetitive by restoring to a starting number when a certain final number is reached. Although decimal notation has been used for descriptive purposes because of greater familiarity to most people, in actual practice a binary computer would probably be used. Those familiar with digital computers are aware of the necessary programming for performing continuous calculations of this nature. If these numbers are expressed in sequential digital form a very complex but fully prescheduled wave is available. The necessary computer can be very simple, and very easily timed by a simple control oscillator.

The receiving system also includes additional normally inoperative receiver multipliers and filters 83′, 87′, and 83″, 87″ supplied from the noise generator 85 thru delay means 93′ and 93″ respectively.

The delay means 93′ provides a short delay so that correlation in receiver multipliers and filters 83, 87 and 83′, 87′ can be balanced to get the generators 65 and 85 accurately in synchronism. A fast acting subtractor 95 across the outputs of 83 and 83′ provides a reversible voltage which may be used to control a reactance tube circuit modifying the frequency of oscillator 91 to hold synchronization. A fairly slow acting adder 99 across the same outputs is used for identifying approximate synchronism for turning on the entire system to establish accurate synchronism, to condition the detonator circuits, and to advise the operator at the control station that the circuits are ready. For the last function an answer-back transmitter 97 is provided at the receiving station controlled by the output of the adder 99.

The delay means 93″ corresponds substantially to the delay 73 of the transmitting system, but is adjusted to have an additional delay equal to one half the delay 93′ so that when the correlation of the two receiver multiplier circuits 87 and 87′ is balanced the shift of switch 75 to include delay 73 will result in precise synchronization with the delayed signal supplied to receiver multiplier 87″.

The output of receiver multiplier and filter 83″, 87″ is supplied to a detonator 98.

It will now be apparent that the operation of the transmiter by the (undelayed) noise generator output through switch 75 will soon meet approximate synchronnization at the receiver to fully energize the receiving system, attain even better synchronization by control of oscillator 91, inform control station that receiver is ready, and hold the detonator circuit ready for operation. Operation of switch 75 to include the delay 73 will then find the generator 85 properly synchronized by the delay 93″ and the output of filter 83″ will operate the detonator. Ordinarily the entire receiving system would be destroyed by the detonation and therefore the answer-back would stop; promptly restoring the switch 75 to exclude the delay would provide a further test for completion of the objective of the device.

An elementary form of the invention and a typical application to a complex system have been described to facilitate an understanding of the invention, but many further variations will be apparent to those skilled in the art.

What is claimed is:

1. A security remote control system comprising a source of prescheduled random noise modulating a suppressed carrier transmitter at a control station to transmit the noise sidebands of said carrier, a receiver multiplier for said sidebands and a narrow band filter tuned to said carrier to actuate a device at a controlled station, one input to said multiplier comprising a source of substantially identical prescheduled noise, the rate of generation of said noise sources differing slightly at said two stations to cause frequent periods of synchronism of sufficient duration for the carrier restored by operation of said multiplier on said sidebands and said second noise to pass said narrow band filter and actuate said device.

2. A security remote control system comprising a source of prescheduled random noise modulating a suppressed carrier transmitter at a control station to transmit the noise sidebands of said carrier, a receiver multiplier for said sidebands and a narrow band filter tuned to said carrier to actuate a device at a controlled station, one input to said multiplier comprising a source of substantially identical prescheduled noise, the rate of generation of said noise sources differing slightly at said two stations to cause frequent periods of synchronism of sufficient duration for the carrier restored by operation of said multiplier on said sidebands and said second noise to pass said narrow band filter and actuate said device, said noise sources providing successive repeated noise trains of identical duration and form, but of slightly different spacing.

(References on following page)

References Cited in the file of this patent

UNITED STATES PATENTS

| | | |
|---|---|---|
| 1,474,426 | Affel | Nov. 20, 1923 |
| 1,480,217 | Mills | Jan. 8, 1924 |
| 2,178,089 | Walker | Oct. 31, 1939 |
| 2,276,863 | Peterson | Mar. 17, 1942 |
| 2,399,469 | Cook | Apr. 30, 1946 |
| 2,401,403 | Bedford | June 4, 1946 |
| 2,418,119 | Hansen | Apr. 1, 1947 |
| 2,487,682 | Wenot | Nov. 8, 1949 |
| 2,580,148 | Wirkler | Dec. 25, 1951 |
| 2,623,169 | Gardere | Dec. 23, 1952 |
| 2,643,819 | Lee et al. | June 30, 1953 |
| 2,676,206 | Bennett et al. | Apr. 20, 1954 |
| 2,718,638 | De Rosa et al. | Sept. 20, 1955 |